Patented Jan. 8, 1929.

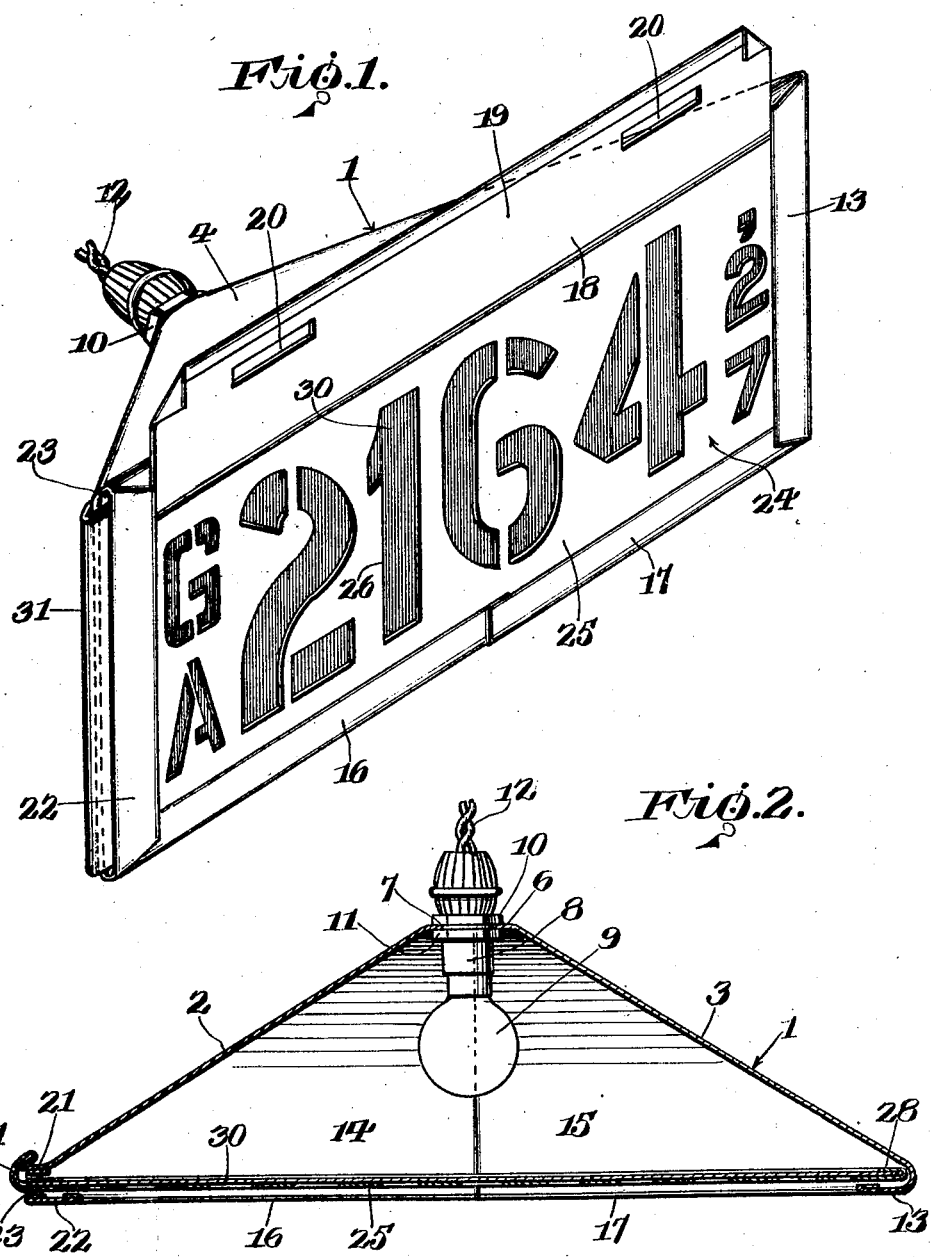

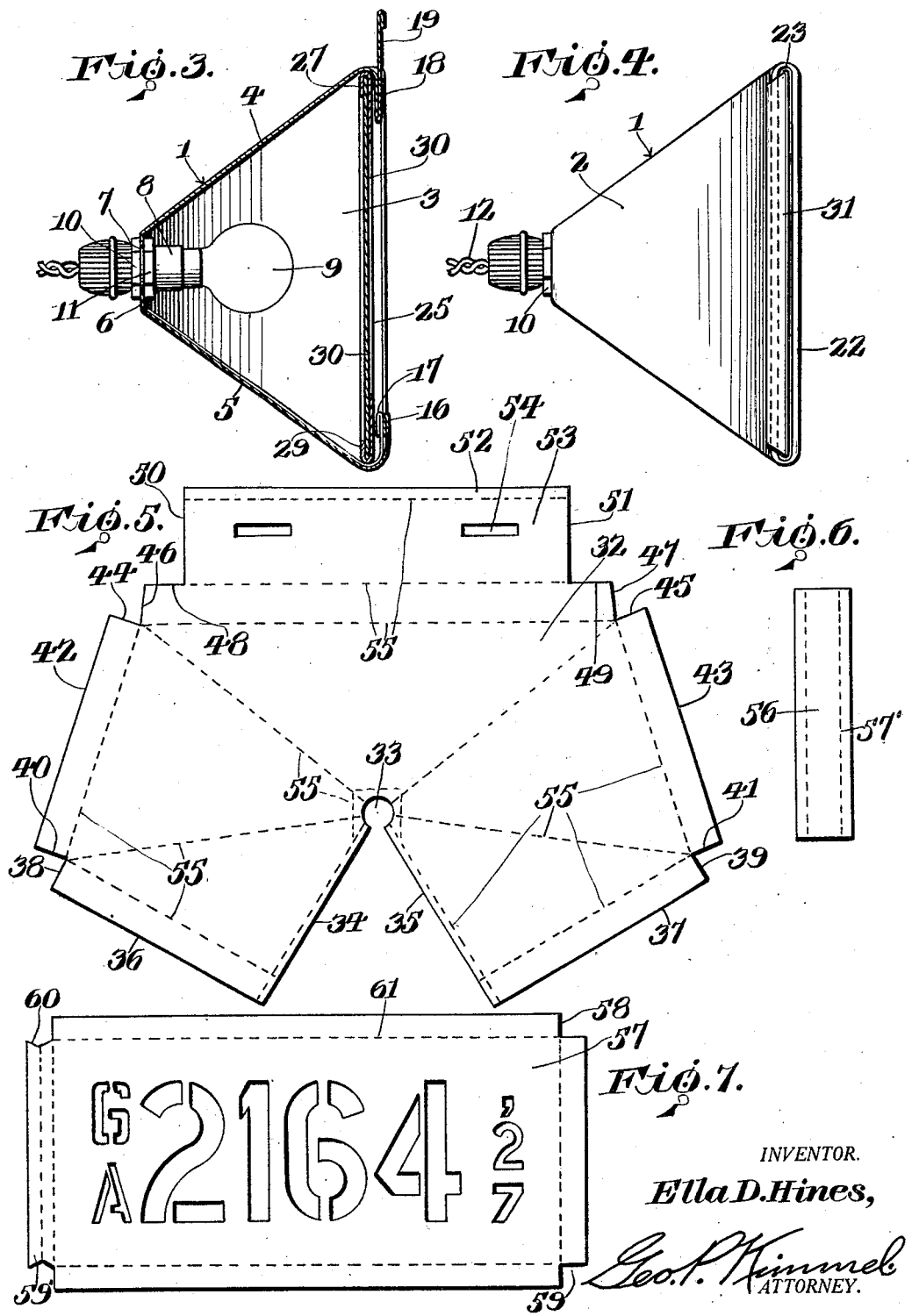

1,698,681

UNITED STATES PATENT OFFICE.

ELLA D. HINES, OF ATLANTA, GEORGIA.

COMBINED TAIL-LIGHT AND LICENSE PLATE.

Application filed December 19, 1927. Serial No. 241,119.

This invention relates to a combined tail light and license plate for use on motor vehicles, and has for its object to provide, in a manner as hereinafter set forth, a unit including a license plate and an illuminating element and with the latter functioning at night to not only provide the tail light of the vehicle, but also for the visibility of the license number of the latter.

Further objects of the invention are to provide, in a manner as hereinafter set forth, a combined tail light and license plate for motor vehicles which is simple in its construction and arrangement, strong, durable, compact, thoroughly efficient in its use, readily assembled, not impairing in any manner the rear of the vehicle when the device is connected therewith, readily installed with respect to a vehicle body, and comparatively inexpensive to manufacture.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claim hereunto appended.

In the drawings wherein like reference characters denote corresponding parts throughout the several views:

Figure 1 is a perspective view of a combined tail light and license plate in accordance with this invention.

Figure 2 is a sectional plan thereof.

Figure 3 is a cross sectional view.

Figure 4 is an end view.

Figure 5 is a plan of the blank from which the open front casing of the device is formed.

Figure 6 is a plan of the blank from which the coupling strip is formed.

Figure 7 is a plan of the blank from which the license plate is formed.

Referring to the drawings in detail a combined tail light and license plate in accordance with this invention includes an open front casing referred to generally at 1 and formed of a pair of side walls 2, 3, a top wall 4, a bottom wall 5 and a rear wall 6. The walls 2, 3, 4 and 5 incline away from the rear wall 6 and each of the walls 2, 3, 4 and 5 gradually increase in width forwardly with respect to the rear wall 6. The manner of setting up the walls 2, 3, 4 and 5 with respect to the rear wall 6 provides an open front casing of pyramidal contour. The casing 1 is formed from a single blank of sheet metal having one face thereof highly polished to provide a reflecting surface on the inner face of the casing 1 when the latter is set up. The rear wall 6 is formed with an opening 7 for the passage of a plug 8 carrying an illuminating element 9. The plug 8 is secured to the rear wall 6 by the clamping nuts 10, 11. Circuit wire connections leading to the plug 8 are indicated at 12. The connections 12, lamp 9 and socket 8 form an illuminating element constituting the tail light of a vehicle.

The forward end of the side wall 3 is provided with an inturned flange 13. The bottom wall 5 is constructed of two overlapping sections 14, 15 and each of said sections at its forward end is provided with an upstanding flange 16, 17 and with the flange 17 overlapping the flange 16. The lower end of the flange 13 overlaps the outer end of the flange 17. The wall 4 at its forward end is provided with a depending flange 18 which is overlapped at one end by the upper end of the flange 13. Formed integral with the flange 18, positioned against the front face thereof and projecting a substantial distance above said flange is a rectangular hanger member 19 of a length less than the length of the flange 18 and formed with spaced rectangular slots 20 for the passage of holdfast devices to connect, secure or suspend the casing 1 from the vehicle body. The forward end of the wall 2 is bent upon itself as at 21 and angularly disposed with respect to the remaining part of said wall 2 to provide a flat guide. Secured to the other end of the flange 18 and to the outer end of the flange 16 is a coupling strip 22 for the flanges 16 and 18 and which opposes the portion 21 of the wall 2 and is associated therewith to provide, in connection with the flanges 16 and 18 an entrance slot 23 for the license plate 24. The flanges 13, 16, 17 and 18, in connection with the strip 22, provide combined guides and retainers for the license plate 24, as the latter when mounted in position is arranged rearwardly of such flanges and the outer end portion of the license plate is frictionally held between the coupling strip 22 and the guide 21 whereby the license plate is prevented from working out through the slot 23.

The license plate 24 consists of a rectangular body portion 25 formed with apertures or rather cutouts to provide indicia to constitute the license number, the State issuing the license and the year. The indicia is indicated at 26. The body portion 24 at its top, one end and at its bottom is formed with inturned flanges 27, 28 and 29 respectively, which oppose the rear face of the body portion 25 and provide means for securing a translucent panel 30 against the rear face of the body portion 25. The panel 30 extends across the openings formed in the body portion 25. The body portion 25 at its other end has a curved extension 31 constituting a handle piece and which when the license plate 24 is positioned to extend across the open front of the casing 1 is positioned exteriorly thereof and further acts as a stop for the sliding of the license plate 24 in position with respect to the open front of the casing 1.

The blank from which the casing 1 is formed consists of a body portion 32 having a circular opening 33 and communicating therewith is a V-shaped cutout. The body portion 32 includes oppositely extending inclined edges 34, 35, a pair of oppositely inclined edges 36, 37 which extend from the outer ends of the edges 34, 35 respectively, a pair of oppositely inclined edges 38, 39 which extend from the outer ends of the edges 36, 37 respectively, a pair of oppositely extending inclined edges 40, 41 which extend from the inner ends of the edges 38, 39 respectively, a pair of oppositely extending inclined edges 42, 43 which extend from the outer ends of the edges 40, 41 respectively, a pair of oppositely extending inclined edges 44, 45 which extend inwardly from the edges 42, 43 respectively and are arranged in parallelism with respect to the edges 40, 41 respectively, a pair of oppositely inclined edges 46, 47, which extend from the inner ends of the edges 44, 45 respectively, a pair of inwardly extending edges 48, 49, which are disposed at right angles with respect to the outer ends of the edges 46, 47, a pair of straight edges 50, 51 which are disposed at right angles and project from the inner ends of the edges 48, 49 respectively and a straight edge 52 which connects the ends of the edges 50, 51 respectively. That part of the body portion 32 bounded by the edges 50, 51 and 52 and indicated at 53 is provided with a pair of spaced rectangular slots 54. The edges 36, 37 incline towards the edges 38, 39. The edges 40, 41 extend outwardly with respect to the edges 38, 39. The edges 42, 43 incline inwardly towards the edges 44, 45. The edges 36, 37 are of greater length than the edges 38, 39, respectively, and the edges 38, 39 are of the same length as the edges 40, 41, respectively. The edges 42, 43 are of greater length than the edges 38, 39, 44, 45. The inner ends of the edges 34, 35 terminate in the edge of the opening 33, the latter being split. The blank or body portion 32 is folded on the lines 55 to provide the casing 1.

The blank from which the coupling strip 22 is formed comprises a rectangular body portion 56, which is bent on the scores 57'.

The blank from which the body portion 25 of the license plate 24 is formed is illustrated in Figure 7 and comprises a body portion 57 cut out as at 58, 59 at the upper and lower corner of one end thereof. The other end of the body portion 57 is formed with a rectangular extension 59' having oppositely disposed V-shaped edges 60. The blank shown in Figure 7 is folded on the scores 61.

It is thought the many advantages of a combined tail light and license plate, in accordance with this invention, can be readily understood, and although the preferred embodiment of the invention is as illustrated and described, yet it is to be understood that changes in the details of construction can be had which fall within the scope of the claim hereunto appended.

What I claim is:

In a combined tail light and license plate for motor vehicles, an open front casing having a top wall, a bottom wall and a side wall, each being formed with an inturned flange for positioning a license plate against, said casing further having another side wall formed with an angularly offset terminal portion doubled upon itself to provide a guide for the license plate, and a connecting element for said top and bottom wall flanges, said connecting element being disposed opposite to said guide and coacting therewith to frictionally hold the license plate against lateral displacement, said top wall flange having a portion thereof doubled upon itself and projecting above the casing to provide a suspension element for the latter, said doubled portion being of less length than the top wall flange and disposed centrally with respect to the length thereof to permit said side wall flange and said connecting member to bear against the outer face of said top wall flange.

In testimony whereof, I affix my signature hereto.

ELLA D. HINES.